(12) United States Patent
Tanaka et al.

(10) Patent No.: US 10,577,457 B2
(45) Date of Patent: Mar. 3, 2020

(54) TERMINALLY MODIFIED POLYBUTYLENE TEREPHTHALATE RESIN, THERMOPLASTIC RESIN COMPOSITION INCLUDING SAME, AND MOLDED ARTICLE

(71) Applicant: Toray Industries, Inc., Tokyo (JP)

(72) Inventors: Tsuyoshi Tanaka, Otsu (JP); Yusuke Tojo, Nagoya (JP); Makito Yokoe, Nagoya (JP); Hideyuki Umetsu, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 190 days.

(21) Appl. No.: 15/764,163

(22) PCT Filed: Oct. 24, 2016

(86) PCT No.: PCT/JP2016/081419
§ 371 (c)(1),
(2) Date: Mar. 28, 2018

(87) PCT Pub. No.: WO2017/073506
PCT Pub. Date: May 4, 2017

(65) Prior Publication Data
US 2018/0223040 A1 Aug. 9, 2018

(30) Foreign Application Priority Data
Oct. 30, 2015 (JP) ................. 2015-214370

(51) Int. Cl.
*C08G 63/50* (2006.01)
*C08L 67/02* (2006.01)

(52) U.S. Cl.
CPC ............ *C08G 63/50* (2013.01); *C08L 67/02* (2013.01); *C08L 2205/025* (2013.01)

(58) Field of Classification Search
CPC ... C08L 67/02; C08L 2205/025; C08G 63/50; C08G 63/672; C08G 63/83; C08G 63/85
See application file for complete search history.

(56) References Cited

U.S. PATENT DOCUMENTS

| 5,763,538 | A | * | 6/1998 | Hunter | ................. C08K 5/1515 525/440.04 |
| 2011/0092626 | A1 | | 4/2011 | Sakata | |
| 2015/0068602 | A1 | * | 3/2015 | Sakurai | .................. B29C 55/12 136/259 |

FOREIGN PATENT DOCUMENTS

| JP | 63-35824 A | 2/1988 |
| JP | 63-314267 A | 12/1988 |
| JP | 11-92639 A | 4/1999 |
| JP | 11-258836 A | 9/1999 |
| JP | 2001-247681 A | 9/2001 |
| JP | 2010-280862 A | 12/2010 |
| JP | 2014-129513 A | 7/2014 |

OTHER PUBLICATIONS

Lin, Q., et al., "Synthesis and Characterization of Poly (ethylene glycol) Methyl Ether Endcapped Poly(ethylene terephthalate)", *Macromolecular Symposia*, 2003, vol. 199, Issue 1, pp. 163-172.
The Extended Search Report dated Apr. 8, 2019, of counterpart European Application No. 16859736.7.

* cited by examiner

Primary Examiner — Christopher M Rodd
(74) Attorney, Agent, or Firm — DLA Piper LLP (US)

(57) ABSTRACT

A terminal modified polybutylene terephthalate resin has a weight average molecular weight Mw of 10,000 to 100,000, a melting point of 210° C. to 235° C., and a melt viscosity μ at 250° C. of not more than 10 Pa·s, and includes 90 to 300 mol/ton of a compound having a (poly)oxyalkylene structure, the compound being terminally bound in the resin, wherein the weight average molecular weight Mw represents a relative weight average molecular weight with respect to the molecular weight of a standard poly(methyl methacrylate) as determined by gel permeation chromatography using hexafluoroisopropanol (supplemented with 0.005 N sodium trifluoroacetate) as a mobile phase.

8 Claims, No Drawings

TERMINALLY MODIFIED POLYBUTYLENE TEREPHTHALATE RESIN, THERMOPLASTIC RESIN COMPOSITION INCLUDING SAME, AND MOLDED ARTICLE

TECHNICAL FIELD

This disclosure relates to a terminal modified polybutylene terephthalate resin having a very low melt viscosity, high melt stability, and a high melting point, a thermoplastic resin composition containing it, and a molded article containing the thermoplastic resin composition.

BACKGROUND

Polyester resins such as polybutylene terephthalate (PBT) and polyethylene terephthalate (PET) have excellent mechanical properties, heat resistance, moldability, recyclability, and chemical resistance, and can be made into molded articles, films, fibers and the like by melt processing. In particular, PBT is widely used as a material for industrial molded articles such as connectors, relays, and switches for automobiles and electrical/electronic devices. In general, PBT is produced from terephthalic acid (TPA) or an ester-forming derivative thereof, and 1,4-butanediol (BDO).

In JP 2014-129513 A, a small amount of a monomethoxy endcapped poly(ethylene glycol) is added to a thermoplastic resin, and they are reacted during polymerization to improve flowability.

In JP 63-35824 A, a monomethoxy endcapped poly(ethylene glycol) having a high molecular weight is reacted with polyethylene terephthalate (PET) during polymerization to impart an antifouling property and wash durability.

In JP 2001-247681 A, a PBT master batch containing polytetramethylene glycol is prepared to impart thermal shock resistance to PBT.

"Synthesis and characterization of poly(ethylene glycol) methyl ether endcapped poly(ethylene terephthalate)" written by Timothy E. Long, published by Macromolecular Symposia, October 2003, volume 199, issue 1, pp. 163-172 discloses a PET resin obtained by adding a monomethoxy endcapped poly(ethylene glycol) during PET polymerization.

PBT is known to have a higher melt viscosity as its molecular weight increases. Reducing the melt viscosity reduces the shear heating during melt processing, which enables reduced thermal decomposition, lower melt-processing temperatures, and the production of molded articles of complex shape.

However, in the technique in JP 2014-129513 A, the amount of the compound having a (poly)oxyalkylene group is small since a decrease in mechanical properties should be suppressed so that the reduction effect of melt viscosity is small, which is problematic.

In the technique of JP 63-35824 A, the molecular weight of the compound having a (poly)oxyalkylene group is high so that the molecular weight decreases in a molten state, and the reduction effect of melt viscosity is small, which is problematic.

In the technique of JP 2001-247681 A, a compound having a (poly)oxyalkylene group is bound to the backbone rather than to a polymer end to prepare a block copolymer. Therefore, the reduction effect of melt viscosity is hardly obtained, which is problematic.

In the technique of "Synthesis and characterization of poly(ethylene glycol) methyl ether endcapped poly(ethylene terephthalate)" written by Timothy E. Long, published by Macromolecular Symposia, October 2003, volume 199, issue 1, pp. 163-172, the obtained PET resin is a low molecular weight polymer and has a low melting point and low mechanical properties. In addition, the PET resin disadvantageously gels through the introduction of a branched backbone.

It could therefore be helpful to provide a terminal modified polybutylene terephthalate resin having a very low melt viscosity, high melt stability, and a high melting point.

SUMMARY

We thus provide:
a terminal modified polybutylene terephthalate resin having a weight average molecular weight Mw of 10,000 to 100,000, a melting point of 210° C. to 235° C., and a melt viscosity μ at 250° C. of not more than 10 Pa·s, comprising 90 to 300 mol/ton of a compound having a (poly)oxyalkylene structure represented by Formula (A), the compound being terminally bound in the resin,
wherein the weight average molecular weight Mw represents a relative weight average molecular weight with respect to the molecular weight of a standard poly(methyl methacrylate) as determined by gel permeation chromatography using hexafluoroisopropanol (supplemented with 0.005 N sodium trifluoroacetate) as a mobile phase,

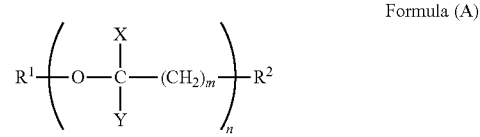

Formula (A)

wherein in Formula (A),
$R^1$ represents a group selected from the group consisting of $C_1$-$C_{30}$ alkyl, $C_6$-$C_{20}$ cycloalkyl, $C_6$-$C_{10}$ aryl, and $C_7$-$C_{20}$ aralkyl;
$R^2$ represents a group selected from the group consisting of hydroxyl, carboxyl, amino, silanol, and thiol;
m represents an integer of 1 to 3;
n represents an integer of 1 to 29;
X represents a hydrogen atom and/or methyl;
Y represents a hydrogen atom and/or methyl; and
the total carbon number of the portion excluding $R^1$ and $R^2$ is 2 to 58.

We also provide a thermoplastic resin composition comprising the terminal modified polybutylene terephthalate resin and another thermoplastic resin, wherein the terminal modified polybutylene terephthalate resin is contained in an amount of 5 to 30 parts by mass with respect to 100 parts by mass of the other thermoplastic resin.

We further provide a molded article comprising the thermoplastic resin composition.

Our terminal modified polybutylene terephthalate resin has a very low melt viscosity, high melt stability, and a high melting point.

DETAILED DESCRIPTION

The terminal modified polybutylene terephthalate resin contains a diol component and a dicarboxylic acid component. The diol component is a component derived from diol among the components constituting the polybutylene terephthalate resin. Similarly, the dicarboxylic acid component is a component derived from dicarboxylic acid or a dialkyl ester thereof. In the terminal modified polybutylene terephthalate resin, the major diol component is the 1,4-butanediol component, and the major dicarboxylic acid component is the terephthalic acid component. The major diol component herein means that the ratio of the 1,4-butanediol component to the total diol component constituting the terminal modified polybutylene terephthalate is not less than 80 mol %. The major dicarboxylic acid component herein means that the ratio of the terephthalic acid component to the total dicarboxylic acid component constituting the terminal modified polybutylene terephthalate is not less than 80 mol %.

As long as the desired effect is not substantially deteriorated, the terminal modified polybutylene terephthalate resin may be copolymerized to include, as a copolymer component, a compound having two polymerizable functional groups. Examples of such a compound include aromatic dicarboxylic acids such as isophthalic acid, 5-sulfoisophthalic acid salts, phthalic acid, naphthalene-2,6-dicarboxylic acid, and bisphenol dicarboxylic acid, and dialkyl esters thereof; aliphatic dicarboxylic acids such as succinic acid, adipic acid, pimelic acid, suberic acid, azelaic acid, sebacic acid, 1,9-nonanedicarboxylic acid, and 1,12-dodecanedicarboxylic acid, and dialkyl esters thereof; and diol components such as ethanediol, propanediol, pentanediol, hexanediol, 2-methyl-1,3-propanediol, and bisphenol A-ethylene oxide adduct. A component(s) derived from these compounds may be contained in an amount of not more than 10% by mass with respect to the total the monomer components constituting the polybutylene terephthalate resin. These compounds can be used individually or in a combination of two or more. Examples of dicarboxylic acid dialkyl esters include dimethyl dicarboxylate and diethyl dicarboxylate. Preferred copolymerization components are the above-described compounds having two polymerizable functional groups. Compounds having three or more polymerizable functional groups such as trimethyl 1,3,5-benzenetricarboxylate act as a cross-linking point and thus tend to provide a polymer having a low melting point and low melt stability. The mass ratio of compounds having three or more polymerizable functional groups contained in the polymer is preferably not more than 0.8% by mass with respect to the total monomer components constituting the polybutylene terephthalate resin. The mass ratio is more preferably not more than 0.5% by mass, still more preferably 0% by mass.

The weight average molecular weight (Mw) of the terminal modified polybutylene terephthalate resin needs to be not less than 10,000 from the viewpoint of achieving excellent mechanical properties of molded articles containing a resin composition containing the terminal modified polybutylene terephthalate resin. A weight average molecular weight of less than 10,000 leads to low mechanical strength, which is problematic. The weight average molecular weight is preferably not less than 14,000, more preferably not less than 18,000. For prevention of thermal deterioration during the production, the weight average molecular weight needs to be not more than 100,000. A weight average molecular weight of more than 100,000 leads to difficulty in molding, which is problematic. The weight average molecular weight is preferably not more than 90,000, more preferably not more than 80,000. The weight average molecular weight can be determined by gel permeation chromatography (GPC) at 30° C. using a hexafluoroisopropanol solvent and columns composed of two Shodex GPC HFIP-806M columns and a Shodex GPC HFIP-LG column connected in series, using as a mobile phase hexafluoroisopropanol (supplemented with 0.005 N sodium trifluoroacetate). The weight average molecular weight is a value relative to the molecular weight of standard poly(methyl methacrylate). The number average molecular weight described below is also determined by the same method as described above.

The terminal modified polybutylene terephthalate resin is required to have a melting point of 210° C. to 235° C. To achieve high melt processability, the melting point is preferably 215° C. to 235° C., more preferably 220° C. to 235° C., especially preferably 220° C. to 230° C. A melting point of less than 210° C. leads to low heat resistance, which is problematic. On the other hand, when the melting point exceeds 235° C., the crystallinity and the crystal size are very large so that excessive heating is required during the melt processing. Thus, there is a problem that the polybutylene terephthalate resin, and the structure derived from the compound having a (poly)oxyalkylene structure represented by Formula (A) terminally bound to the polybutylene terephthalate resin, may be degraded at the same time. The melting point of the terminal modified polybutylene terephthalate resin is a peak top temperature of an endothermic peak observed by differential scanning calorimetry (DSC) in which the resin is heated from 30° C. to 250° C. at a heating rate of 20° C./min., held at 250° C. for 5 minutes, cooled from 250° C. to 30° C. at a cooling rate of 20° C./min., and then heated from 30° C. to 250° C. at a heating rate of 20° C./min.

The crystal melting enthalpy, which is represented by the area of the endothermic peak, is preferably not less than 40 J/g, more preferably not less than 45 J/g, from the viewpoint of achieving excellent heat resistance. The crystal melting enthalpy is preferably not more than 60 J/g, more preferably not more than 55 J/g, from the viewpoint of achieving excellent melt processability. The crystal melting enthalpy can adjusted to the range described above when the ratio of the 1,4-butanediol component to the total diol component constituting the terminal modified polybutylene terephthalate resin is not less than 80 mol %, and the ratio of the terephthalic acid component to the total dicarboxylic acid component is not less than 80 mol %.

Furthermore, in the terminal modified polybutylene terephthalate resin, the peak top temperature of an exothermic peak observed by differential scanning calorimetry (DSC) in which the resin is heated from 30° C. to 250° C. at a heating rate of 20° C./min., held at 250° C. for 5 minutes, and then cooled from 250° C. to 30° C. at a cooling rate of 20° C./min. (crystallization temperature on cooling) is preferably not less than 160° C. from the viewpoint of achieving excellent crystallinity. The crystallization temperature on cooling is more preferably not less than 165° C., still more preferably not less than 170° C. The crystallization temperature on cooling is preferably not more than 200° C. The crystallization temperature on cooling is preferably not more than 200° C. because a crystallization temperature on cooling higher than 200° C. tends to lead to a strong intermolecular interaction and a small reduction effect of melt viscosity. The crystallization temperature on cooling is more preferably not more than 190° C., still more preferably not more than 180° C.

The terminal modified polybutylene terephthalate resin is characterized by having a melt viscosity much lower than those of conventional polybutylene terephthalate resins. The terminal modified polybutylene terephthalate resin is required to have a melt viscosity μ (Pa·s) at 250° C. of not more than 10 Pa·s from the viewpoint of achieving an excellent reduction effect of melt viscosity. When the melt viscosity is low, shear heating during the polymerization is suppressed, and degradation can therefore be suppressed. Thus, the melt viscosity is preferably not more than 8 Pa·s, more preferably not more than 6 Pa·s. There is no lower limit to the melt viscosity μ. The lower the melt viscosity μ, the better the melt processability. The lower limit of the melt viscosity is theoretically 0 Pa·s. The melt viscosity μ (Pa·s) at 250° C. refers to a melt viscosity μ (Pa·s) of the resin melted at 250° C. for 5 minutes in a nitrogen atmosphere, as determined using a rheometer (MCR501 available from Anton Paar) in the oscillatory mode at a frequency of 3.0 Hz and an amplitude of 20%.

The terminal modified polybutylene terephthalate resin is required to include 90 to 300 mol/ton of a compound which is terminally bound therein represented by Formula (A),

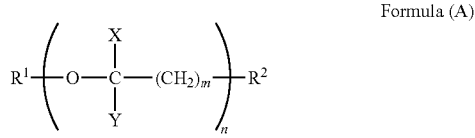

Formula (A)

wherein,
$R^1$ represents a group selected from the group consisting of $C_1$-$C_{30}$ alkyl, $C_6$-$C_{20}$ cycloalkyl, $C_6$-$C_{10}$ aryl, and $C_7$-$C_{20}$ aralkyl;
$R^2$ represents a group selected from the group consisting of hydroxyl, carboxyl, amino, silanol, and thiol;
m represents an integer of 1 to 3;
n represents an integer of 1 to 29;
X represents a hydrogen atom and/or methyl;
Y represents a hydrogen atom and/or methyl; and
the total carbon number of the portion excluding $R^1$ and $R^2$ is 2 to 58.

The compound represented by Formula (A) having a (poly)oxyalkylene structure (which may be hereinafter referred to as Compound (A)) has an ether linkage, which has high molecular mobility, and a solubility parameter similar to those of polybutylene terephthalate resins, thus having high compatibility. Thus, the compound having a (poly)oxyalkylene structure can reduce the intermolecular interaction of the polybutylene terephthalate molecular chain during melting and increase the free volume, significantly increasing the molecular mobility of the polymer chain. As a result, a significant reduction effect of melt viscosity is obtained.

$R^1$ of Compound (A) is a group selected from $C_1$-$C_{30}$ alkyl groups, $C_6$-$C_{20}$ cycloalkyl groups, $C_6$-$C_{10}$ aryl groups, and $C_7$-$C_{20}$ aralkyl groups. Specific examples of the $C_1$-$C_{30}$ alkyl groups include methyl, ethyl, propyl, butyl, pentyl, hexyl, heptyl, and octyl. Specific examples of the $C_6$-$C_{20}$ cycloalkyl groups include cyclohexyl, cyclopentyl, cyclooctyl, and cyclodecyl. Specific examples of the $C_6$-$C_{10}$ aryl groups include phenyl, tolyl, dimethylphenyl, and naphthyl. Specific examples of the $C_7$-$C_{20}$ aralkyl groups include benzyl, phenethyl, methylbenzyl, 2-phenylpropan-2-yl, and diphenylmethyl. $R^1$ is preferably a $C_1$-$C_{30}$ alkyl group, especially preferably methyl.

$R^2$ of Compound (A) is a functional group capable of binding to the polybutylene terephthalate resin, and is a group selected from hydroxyl, carboxyl, amino, silanol, and thiol. From the viewpoint of achieving high reactivity with the polybutylene terephthalate resin, $R^2$ is preferably hydroxyl or carboxyl.

m of Compound (A) is required to be an integer of 1 to 3 to achieve high heat resistance. m is preferably an integer of 1 or 2, more preferably 1. When m is 3 or less, the proportion of the ether linkage in the terminal portion is large, which can increase the reduction effect of melt viscosity.

n of Compound (A) is required to be an integer of 1 to 29 to achieve a high reduction effect of melt viscosity and high melt stability. n is preferably an integer of 3 or more, more preferably an integer of 5 or more. n is preferably an integer of 25 or less, more preferably an integer of 20 or less. When n exceeds 29, the reduction effect of melt viscosity is small, and the melt stability is poor.

X in Compound (A) is a hydrogen atom and/or methyl. When X is a hydrogen atom and/or methyl, the affinity for the polybutylene terephthalate moiety, the main backbone, is high, which can increase the reduction effect of melt viscosity.

Y in Compound (A) is a hydrogen atom and/or methyl. When Y is a hydrogen atom and/or methyl, the affinity for the polybutylene terephthalate moiety, the main backbone, is high, which can increase the reduction effect of melt viscosity.

In Compound (A), the total carbon number of the portion excluding $R^1$ and $R^2$ is 2 to 58. When the total carbon number of the portion excluding $R^1$ and $R^2$ is 2 to 58, a terminal modified polybutylene terephthalate resin having a high reduction effect of melt viscosity and high melt stability can be obtained.

In the terminal modified polybutylene terephthalate resin, the concentration of Compound (A) terminally bound is required to be 90 to 300 mol/ton. To increase the reduction effect of melt viscosity, the concentration of Compound (A) is preferably not less than 95 mol/ton, more preferably not less than 100 mol/ton. To increase the molecular weight of the terminal modified polybutylene terephthalate resin, the concentration of Compound (A) is preferably not more than 290 mol/ton, more preferably not more than 280 mol/ton. When the concentration of Compound (A) is less than 90 mol/ton, the reduction effect of melt viscosity is small, which is problematic. When the concentration of Compound (A) exceeds 300 mol/ton, the molecular weight of the terminal modified polybutylene terephthalate resin can be hardly increased so that the melt stability is low, which is problematic.

The mass ratio of Compound (A) terminally bound to the polybutylene terephthalate resin to 100% by mass of the terminal modified polybutylene terephthalate resin is preferably not less than 5% by mass. When the mass ratio of Compound (A) is not less than 5% by mass, the reduction effect of melt viscosity can be high. The mass ratio of Compound (A) is more preferably not less than 7% by mass, still more preferably not less than 9% by mass. To increase the molecular weight of the terminal modified polybutylene terephthalate resin, the mass ratio of Compound (A) is preferably not more than 50% by mass. The mass ratio of Compound (A) is more preferably not more than 40% by mass, still more preferably not more than 30% by mass. When the mass ratio of Compound (A) is less than 5% by mass, the reduction effect of melt viscosity is small and insufficient, while when the mass ratio exceeds 50% by mass, the heat resistance is low, which is problematic.

The terminal modified polybutylene terephthalate resin includes a certain amount of compound having a (poly)oxyalkylene structure represented by Formula (A), which compound is terminally bound to the polymer. Therefore, the molecular mobility during melting can be increased without inhibiting crystallinity of the main backbone, polybutylene terephthalate resin, so that the melt viscosity can be remarkably reduced.

When the compound having a (poly)oxyalkylene structure is bound to the backbone of the polybutylene terephthalate resin, as compared to when the compound is terminally bound, both terminals of the (poly)oxyalkylene structure are constrained, as a result of which a sufficient molecular-mobility-improving effect tends not to be obtained. In addition, the crystallization temperature on cooling of the polybutylene terephthalate resin tends to be low, leading to low crystallinity. On the other hand, by terminally binding Compound (A) to the polybutylene terephthalate resin, the decrease in the crystallinity can be suppressed. Further, the terminal binding allows formation of an ordered, microphase separation-like structure by the (poly)oxyalkylene structure and the polybutylene terephthalate structure so that various additives tend to become more concentrated. For example, when an antioxidant is added, a long-term preservation stability and a melt stability that are higher than those in conventional cases can be achieved.

The terminal modified polybutylene terephthalate resin has a low melt viscosity, and undergoes less shear heating during polymerization. Since degradation of the polybutylene terephthalate resin can be suppressed, formation of carboxyl groups can be suppressed. The terminal modified polybutylene terephthalate resin preferably has an acid value (carboxyl group concentration) of not more than 13 mol/ton to achieve high hydrolysis resistance. The acid value is more preferably not more than 10 mol/ton, still more preferably not more than 7 mol/ton. The lower limit of the acid value is not limited. From the viewpoint of suppressing hydrolysis using carboxy groups as an acid catalyst, the acid value is preferably as close to zero as possible. The lower limit of the acid value is theoretically 0. The hydrolysis resistance can be evaluated by determining a weight average molecular weight retention by dividing a weight average molecular weight of the terminal modified polybutylene terephthalate resin that has been treated under the conditions of 121° C. and 100% RH for 24 hours by a weight average molecular weight of the resin that has not been treated. The weight average molecular weight retention is preferably not less than 60%, more preferably not less than 70%. The weight average molecular weight can be determined by gel permeation chromatography as described above.

The terminal modified polybutylene terephthalate resin preferably has a weight loss ratio of not more than 15% when it is kept at 250° C. for 1 hour under nitrogen gas flow. Within this range, the change in viscosity during melting can be minimized, which enables stable melt processing. The weight loss ratio is more preferably not more than 10%, still more preferably not more than 5%. The weight loss ratio of the terminal modified polybutylene terephthalate resin is a weight loss ratio determined by using a thermogravimetric analyzer (TGA) while the resin is heated from 30° C. to 250° C. at a heating rate of 200° C./min., and then held at 250° C. for 1 hour.

The polydispersity (Mw/Mn), which is represented by the ratio between the weight average molecular weight (Mw) and the number average molecular weight (Mn) of the terminal modified polybutylene terephthalate resin, is preferably not more than 2.5. The polydispersity is more preferably not more than 2.3, still more preferably not more than 2.0. The terminal modified polybutylene terephthalate resin, for its low melt viscosity, tends to polymerize uniformly in melt polymerization and have a small polydispersity. Although there is no lower limit to the polydispersity, it is theoretically at least 1.0. A polydispersity of more than 2.5 tends to result in reduced mechanical properties such as toughness, because the amount of low-molecular-weight component is relatively large.

Since the terminal modified polybutylene terephthalate resin has low melt viscosity and high flowability, it can be easily processed into injection-molded articles, fibers, films and the like, and can be widely used for molding materials for electrical components, automobile components, and the like, as well as for films, fibers, and blow bottles. This effect allows the terminal modified polybutylene terephthalate resin to be processed at low temperatures, which can reduce thermal energy, leading to a reduced environmental load.

In injection molding, use of the terminal modified polybutylene terephthalate resin easily allows production of molded articles having complex shapes whose production has been difficult with conventional polybutylene terephthalate resins.

With regard to fibers, it has been difficult to perform melt spinning because of a melt viscosity increasing with increasing molecular weight. However, the terminal modified polybutylene terephthalate resin makes it easy to perform melt spinning of high-molecular-weight polymers and undergoes less shear heating during melting to avoid decomposition, thus providing fibers with high strength.

Also with regard to films, similarly to the fibers, it has been difficult to perform melt film formation because of a melt viscosity increasing with increasing molecular weight. However, the terminal modified polybutylene terephthalate resin makes it easy to perform melt film formation of high-molecular-weight polymers and undergoes less shear heating during melting to avoid decomposition, thus providing films with high strength.

A description will now be given of a method of producing the terminal modified polybutylene terephthalate resin.

A method of producing the terminal modified polybutylene terephthalate resin has the following two steps: a first step comprising an esterification reaction process (a) or a transesterification reaction process (b), and a subsequent second step comprising a polycondensation reaction process (c).

In the first step, the esterification reaction process (a) is a process in which a dicarboxylic acid and a diol are allowed to undergo esterification reaction at a predetermined temperature until a predetermined amount of water is evaporated to produce a low polycondensate. The transesterification reaction process (b) is a process in which a dicarboxylic acid dialkyl ester and a diol are allowed to undergo transesterification reaction at a predetermined temperature until a predetermined amount of alcohol is evaporated to produce a low polycondensate.

The second step, polycondensation reaction (c), is a process in which the low polycondensate obtained in the esterification reaction (a) or the transesterification reaction (b) is heated under reduced pressure to undergo diol elimination reaction, thereby obtaining a terminal modified polybutylene terephthalate resin.

In the method of producing the terminal modified polybutylene terephthalate resin, Compound (A) is preferably added in any process selected from the processes (a), (b), and (c) for quantitative introduction of Compound (A) to polymer terminals. Compound (A) is more preferably added in the process (a) or the process (b). Although the terminal modified polybutylene terephthalate resin can also be produced by melt-kneading an unmodified polybutylene terephthalate resin and Compound (A) using an extruder, this results in a low rate of introduction of Compound (A) to polybutylene terephthalate terminals so that bleed-out of unreacted Compound (A) tends to occur during heat treatment.

In our method of producing the terminal modified polybutylene terephthalate resin, the maximum temperature in the esterification reaction process (a) or the transesterification reaction process (b) is preferably 140° C. or higher. When the maximum temperature is 140° C. or higher, reactivity of Compound (A) added in the process (a) or process (b) with the polybutylene terephthalate component can be sufficiently secured so that quantitative introduction of Compound (A) into polymer terminals can be achieved. The maximum temperature in the process (a) or process (b) is more preferably 150° C. or higher, still more preferably 160° C. or higher. The maximum temperature is preferably 290° C. or lower. When the maximum temperature is 290° C. or lower, thermal decomposition and volatilization of Compound (A) added in the process (a) or process (b) can be suppressed. The maximum temperature is preferably 280° C. or lower, more preferably 240° C. or lower.

The maximum temperature in the polycondensation reaction process (c) is preferably not less than 230° C. The degree of polymerization of the polymer can be efficiently increased with a maximum temperature of not less than 230° C. The maximum temperature is more preferably not less than 240° C. The maximum temperature in the polycondensation reaction process (c) is preferably not more than 260° C. A maximum temperature of not more than 260° C. can suppress thermal decomposition of the terminal modified polybutylene terephthalate resin. The maximum temperature is more preferably not more than 250° C.

The thus obtained terminal modified polybutylene terephthalate resin may be further subjected to solid phase polymerization to increase the degree of polymerization. The solid phase polymerization may be, but does not necessarily need to be, carried out by heat-treating the resin in an inert gas atmosphere or under reduced pressure. The inert gas may be any gas inactive against the polybutylene terephthalate resin, and examples of the inert gas include nitrogen, helium, and carbon dioxide gas. Nitrogen is more preferably used. In terms of pressure conditions, the pressure in the apparatus is preferably set to not more than 133 Pa, and the pressure is preferably as low as possible to shorten the solid phase polymerization time. From the viewpoint of the reaction rate and the productivity, the solid phase polymerization temperature is preferably not less than 180° C., more preferably not less than 185° C. On the other hand, from the viewpoint of suppressing fusion between polyester chips, the solid phase polymerization temperature is preferably not more than 240° C., more preferably not more than 230° C. The solid phase polymerization temperature may be arbitrarily set within the range described above. In general, when the polymerization is carried out at a low temperature, the reaction rate tends to be low and, therefore, a longer time may be required for achieving an expected intrinsic viscosity. On the other hand, the maximum possible intrinsic viscosity tends to be high. Conversely, when the polymerization temperature is high, the reaction rate increases, but deteriorative reaction proceeds at the same time. Thus, the maximum possible intrinsic viscosity is low.

The terminal modified polybutylene terephthalate resin can be produced by any of batch polymerization, semi-continuous polymerization, and continuous polymerization.

In the method of producing the terminal modified polybutylene terephthalate resin, compounds of, for example, manganese, cobalt, zinc, titanium, and calcium are used as catalysts for the esterification reaction (a). As catalysts for the transesterification reaction (b), compounds of, for example, magnesium, manganese, calcium, cobalt, zinc, lithium, and titanium are used. As catalysts for the polycondensation reaction (c), compounds of, for example, antimony, titanium, aluminum, tin, and germanium are used.

Examples of antimony compounds include oxides of antimony, antimony carboxylates, and antimony alkoxides. Examples of oxides of antimony include antimony trioxide and antimony pentoxide. Examples of antimony carboxylates include antimony acetate, antimony oxalate, and antimony potassium tartrate. Examples of antimony alkoxides include antimony tri-n-butoxide and antimony triethoxide.

Examples of titanium compounds include titanium complexes, titanium alkoxides such as tetra-i-propyl titanate, tetra-n-butyl titanate, and tetra-n-butyl titanate tetramers, titanium oxides obtained by hydrolysis of titanium alkoxides, and titanium acetylacetonate. In particular, titanium complexes containing polycarboxylic acids and/or hydroxycarboxylic acids and/or polyhydric alcohols as chelating agents are preferred to provide polymers with thermal stability and prevent color degradation. Examples of chelating agents in the titanium compounds include lactic acid, citric acid, mannitol, and tripentaerythritol.

Examples of aluminum compounds include aluminum carboxylates, aluminum alkoxides, aluminum chelate compounds, and basic aluminum compounds. Specific examples include aluminum acetate, aluminum hydroxide, aluminum carbonate, aluminum ethoxide, aluminum isopropoxide, aluminum acetylacetonate, and basic aluminum acetate.

Examples of tin compounds include monobutyltin oxide, dibutyltin oxide, methylphenyltin oxide, tetraethyltin oxide, hexaethylditin oxide, triethyltin hydroxide, monobutylhydroxytin oxide, monobutyltin trichloride, and dibutyltin sulfide.

Examples of germanium compounds include germanium oxides and germanium alkoxides. Specific examples of the germanium oxides include germanium dioxide and germanium tetroxide. Specific examples of the germanium alkoxides include germanium tetraethoxide and germanium tetrabutoxide.

Specific examples of magnesium compounds include magnesium oxide, magnesium hydroxide, magnesium alkoxide, magnesium acetate, and magnesium carbonate.

Specific examples of manganese compounds include manganese chloride, manganese bromide, manganese nitrate, manganese carbonate, manganese acetylacetonate, and manganese acetate.

Specific examples of calcium compounds include calcium oxide, calcium hydroxide, calcium alkoxide, calcium acetate, and calcium carbonate.

Specific examples of cobalt compounds include cobalt chloride, cobalt nitrate, cobalt carbonate, cobalt acetylacetonate, cobalt naphthenate, and cobalt acetate tetrahydrate.

Specific examples of zinc compounds include zinc oxide, zinc alkoxide, and zinc acetate.

These metal compounds may be hydrates.

The terminal modified polybutylene terephthalate resin may contain a phosphorus compound serving as a stabilizer. Specific examples include phosphoric acid, trimethyl phosphate, triethyl phosphate, ethyl diethylphosphonoacetate, 3,9-bis(2,6-di-t-butyl-4-methylphenoxy)-2,4,8,10-tetraoxa-3,9-diphosphaspiro[5,5]undecane, and tetrakis(2,4-di-t-butyl-5-methylphenyl)[1,1-biphenyl]-4,4'-diylbisphosphonite. Preferred are trivalent phosphorus compounds such as 3,9-bis(2,6-di-t-butyl-4-methylphenoxy)-2,4,8,10-tetraoxa-3,9-diphosphaspiro[5,5]undecane (PEP36 available from Asahi Denka Kogyo K.K.) and tetrakis(2,4-di-t-butyl-5-methylphenyl)[1,1-biphenyl]-4,4'-diylbisphosphonite (GSY-P101 available from Osaki Industry Co., Ltd.), which provide excellent color and highly improved thermal stability.

The terminal modified polybutylene terephthalate resin preferably contains an antioxidant to suppress oxidative degradation of the compound having a (poly)oxyalkylene structure. The antioxidant is preferably contained in an amount of 0.1 to 5.0 parts by mass with respect to 100 parts by mass of the terminal modified polybutylene terephthalate resin. The content of the antioxidant is more preferably not less than 0.2 part by mass, still more preferably not less than 0.3 part by mass. From the viewpoint of suppressing degradation of the terminal modified polybutylene terephthalate resin due to the antioxidant, the content is more preferably not more than 4.0 parts by mass, still more preferably not more than 3.0 parts by mass. When the content is less than 0.1 part by mass, the effect to suppress oxidative degradation may be insufficient, while when the content is more than 5.0 parts by mass, the heat resistance is low, which is problematic. Specific examples of the antioxidant include, but are not limited to, hindered phenolic antioxidants, sulfur-containing antioxidants, hydrazine-based antioxidants, and triazole-based antioxidants. These may be used individually, or two or more of these may be used in combination.

Examples of hindered phenolic antioxidants include pentaerythritol tetrakis[3-(3,5-di-t-butyl-4-hydroxyphenyl)propionate], thiodiethylenebis[3-(3,5-di-t-butyl-4-hydroxyphenyl)propionate], octadecyl-3-(3,5-di-t-butyl-4-hydroxyphenyl)propionate, and 4,6-bis(octylthiomethyl)-o-cresol. In particular, pentaerythritol tetrakis[3-(3,5-di-t-butyl-4-hydroxyphenyl) propionate] (IRGANOX1010 available from Ciba Japan K. K.), which effectively prevents coloring, is preferred.

Examples of sulfur-containing antioxidants include dilauryl thiodipropionate, ditridecyl thiodipropionate, dimyristyl thiodipropionate, distearyl thiodipropionate, pentaerythritol-tetrakis(3-laurylthiopropionate), and pentaerythritol-tetrakis (3-dodecylthiopropionate).

Examples of hydrazine-based antioxidants include decamethylene dicarboxylic acid-bis(N'-salicyloyl hydrazide), isophthalic acid bis(2-phenoxypropionyl hydrazide), and N-formyl-N'-salicyloyl hydrazine.

Examples of triazole-based antioxidants include benzotriazole and 3-(N-salicyloyl)amino-1,2,4-triazole.

Furthermore, dyes used in resins and other materials as color adjusters may optionally be added. Specific examples, according to COLOR INDEX GENERIC NAMES, of the dyes include blue color adjusters such as SOLVENT BLUE 104 and SOLVENT BLUE 45; and violet color adjusters such as SOLVENT VIOLET 36; which are preferred because of their high heat resistance at high temperatures and excellent color-developing properties. These may be used individually, or two or more of these may be used in combination.

In processing the terminal modified polybutylene terephthalate resin into various products, one or more additives such as fluorescent brightening agents including pigments and dyes, colorants, lubricants, antistatic agents, flame retardants, UV absorbers, antibacterial agents, nucleating agents, delusterants, plasticizers, release agents, antifoaming agents, and other additives, may optionally be added to the extent that the desired effects are not adversely affected.

A thermoplastic resin composition containing the terminal modified polybutylene terephthalate resin as well as another thermoplastic resin may be obtained. Such a thermoplastic resin composition has a low melt viscosity because of the terminally attached structure derived from Compound (A) in the terminal modified polybutylene terephthalate resin. By the use of the terminal modified polybutylene terephthalate resin, functionality can be imparted to the thermoplastic resin composition without changing the production process of the thermoplastic resin composition. Further, by controlling the amounts of the terminal modified polybutylene terephthalate resin and the other thermoplastic resin depending on the intended use, a thermoplastic resin composition having a desired melt viscosity can be easily obtained. When Compound (A) is directly mixed with the other thermoplastic resin, the work environment may become poor because of dispersion of powder into the air, attachment of a liquid, and the like. By the use of the terminal modified polybutylene terephthalate resin, such problems can be solved. Further, since the terminally attached structure derived from Compound (A) tends to be present in the polybutylene terephthalate resin phase, favorable thermal stability can be achieved during melt kneading and molding.

By melt kneading of the terminal modified polybutylene terephthalate resin with the other thermoplastic resin, a thermoplastic resin composition having a low melt viscosity can be easily obtained. Alternatively, by dry blending the terminal modified polybutylene terephthalate resin with the other thermoplastic resin before molding, and then carrying out molding of the blended resins, a thermoplastic resin composition having a low melt viscosity can be easily obtained.

The mass ratio of the terminal modified polybutylene terephthalate resin to 100 parts by mass of the other thermoplastic resin is preferably not less than 5 parts by mass. When the mass ratio is not less than 5 parts by mass, the reduction effect of melt viscosity can be high. The mass ratio is more preferably not less than 7 parts by mass, still more preferably not less than 9 parts by mass. From the viewpoint of avoiding deterioration of properties of the resulting thermoplastic resin, the mass ratio of the terminal modified polybutylene terephthalate resin is preferably not more than 30 parts by mass, more preferably not more than 25 parts by mass, still more preferably not more than 20 parts by mass. When the mass ratio is less than 5 parts by mass, the reduction effect of melt viscosity is small and insufficient, while when the mass ratio exceeds 30 parts by mass, the production cost increases, and properties of the thermoplastic resin change, which is problematic.

The temperature during the melt kneading of the terminal modified polybutylene terephthalate resin with the other thermoplastic resin is preferably not less than 240° C. When the melt kneading temperature is not less than 240° C., the melt kneading can be uniformly carried out. The melt kneading temperature is more preferably not less than 245° C. The melt kneading temperature is preferably not more than 280° C. When the melt kneading temperature is not more than 280° C., thermal decomposition of the terminal modified polybutylene terephthalate resin can be suppressed. The melt kneading temperature is more preferably not more than 275° C.

From the viewpoint of easily carrying out melt kneading with the terminal modified polybutylene terephthalate resin, the other thermoplastic resin is preferably one or more resins selected from the group consisting of polyethylene terephthalate, polytrimethylene terephthalate, polybutylene terephthalate, polyethylene naphthalate, and polybutylene naphthalate. Examples of this thermoplastic resin do not include resins containing a compound having a structure represented by General Formula (A), which compound is terminally bound therein such as the terminal modified polybutylene terephthalate resin.

Since the obtained thermoplastic resin composition has low melt viscosity and excellent melt processability, it can be melt processed by known methods into various products such as fibers, films, bottles, and injection-molded articles. Since the reduction effect of melt viscosity improves the melt processability, when the thermoplastic resin composition is processed into, for example, an injection-molded article, the resin can be easily processed into parts having a thin-walled portion with a thickness of 0.01 to 1.0 mm, parts having a complex shape, large molded articles requiring flowability and a favorable external appearance, and the like.

EXAMPLES

Our resins, compositions and molded articles will now be described in detail with reference to examples.

(1) Weight Average Molecular Weight, Number Average Molecular Weight, Polydispersity By gel permeation chromatography (GPC), the weight average molecular weight (Mw) and the number average molecular weight (Mn) were determined for each of unmodified polybutylene terephthalate resin, terminal modified polybutylene terephthalate resin, thermoplastic resin, and polyester resin. The average molecular weight is a relative value calculated using standard poly(methyl methacrylate) as a standard sample. The polydispersity is a value represented by the ratio (Mw/Mn) of the weight average molecular weight (Mw) to the number average molecular weight (Mn). Using hexafluoroisopropanol (supplemented with 0.005 N sodium trifluoroacetate) as a solvent, a solution containing each sample at a concentration of 1 mg/mL was prepared. A WATERS 410 differential refractometer available from WATERS was used as a detector; a MODEL 510 high-performance liquid chromatography was used as a pump; and two Shodex GPC HFIP-806M columns and a Shodex GPC HFIP-LG column were used as columns. Hexafluoroisopropanol (supplemented with 0.005 N sodium trifluoroacetate) was used as a mobile phase, and the flow rate was set to 1.0 mL/min. Analysis was carried out by injection of 0.1 mL of the sample solution.

(2) Melt Viscosity μ

Using a rheometer (MCR501 available from Anton Paar), 0.5 g of a sample dried in a hot air dryer at 110° C. for at least 12 hours was melted under a nitrogen atmosphere at 250° C. for 5 minutes, and its melt viscosity μ (Pa·s) was measured in the oscillatory mode at a frequency of 3.0 Hz and an amplitude of 20%.

(3) Amount of Compound (A) Introduced to Polymer Terminals ($^1$H-NMR Measurement)

The terminal modified polybutylene terephthalate resin was subjected to $^1$H-NMR measurement using JNM-AL400, an FT-NMR manufactured by JEOL Ltd., with a number of scans of 256. Deuterated HFIP (hexafluoroisopropanol) was used as a solvent for the measurement, and a solution at a sample concentration of 50 mg/mL was used. The integrated intensities of the peaks attributed to the $R^1$ and $R^2$ moieties of Compound (A) and the peaks attributed to the polybutylene terephthalate component, the main backbone of the terminal modified polybutylene terephthalate resin, were calculated, and then divided by the number of hydrogen atoms in each structural unit to determine the composition ratio. Subsequently, the amount (mol/ton) of Compound (A) introduced in the terminal modified polybutylene terephthalate resin was calculated.

(4) Introduction Rate of Compound (A) to Polymer Terminals

The rate was calculated as y×100/x (%), wherein x (mol/ton) represents the amount of total terminal groups calculated by multiplying the reciprocal of the number average molecular weight determined in (1) by 2,000,000, and y (mol/ton) represents the amount of Compound (A) introduced to polymer terminals determined in (3).

(5) Thermal Properties

Thermal properties were measured using a differential scanning calorimeter (DSC7), manufactured by PerkinElmer Co., Ltd. Under a nitrogen atmosphere, 5 mg of each sample was heated from 30° C. to 250° C. at a rate of 20° C./min., held at 250° C. for 5 minutes, and then cooled from 250° C. to 30° C. at a rate of 20° C./min. The peak top temperature of the exothermic peak observed in this process was determined as the crystallization temperature on cooling Tc, and the area of the exothermic peak was determined as the crystallization enthalpy on cooling ΔHc. Subsequently, the sample was heated from 30° C. to 250° C. at a rate of 20° C./min. The peak top temperature of the endothermic peak observed in this process was determined as the melting point Tm, and the peak area of the endothermic peak was determined as the crystal melting enthalpy ΔHm.

(6) Weight loss ratio at 250° C. (Melt Stability)

Using a thermogravimetric analyzer (TGA) manufactured by PerkinElmer Co., Ltd., the resin was heated from 30° C. to 250° C. at a heating rate of 200° C./min. and then held at 250° C. for 1 hour under nitrogen gas flow to measure the weight loss ratio during this process. The smaller the weight loss ratio, the better the thermal stability.

(7) Acid Value

A solution prepared by dissolving a polybutylene terephthalate resin (a) in a mixed solution of o-cresol/chloroform (2/1 vol.) was subjected to titration with 0.05 mol/L ethanolic potassium hydroxide using 1% bromophenol blue as an indicator, and the carboxyl end group concentration was calculated according to the following equation. The end point of the titration was determined based on a blue color (color D55-80; 2007 D Pocket type, Japan Paint Manufacturers Association).

Carboxyl end group concentration [eq/g]=(amount [ml] of 0.05 mol/L ethanolic potassium hydroxide required for titration of o-cresol/chloroform (2/1 vol.) mixed solution containing Component (a) dissolved therein—amount [ml] of 0.05 mol/L ethanolic potassium hydroxide required for titration of o-cresol/chloroform (2/1 vol.) mixed solution) x concentration [mol/ml] of 0.05 mol/L ethanolic potassium hydroxide×1/collected amount [g] of Component (a) used for titration.

(8) Hydrolysis Resistance

A sample dried in a hot air dryer at 110° C. for at least 12 hours was pressed at 250° C. to obtain a sheet with a thickness of 1 mm. Using a highly accelerated stress test chamber available from ESPEC CORP., 50 mg of the sheet was treated under high-humidity conditions of 121° C., 100% RH, and 24 hours, and the weight average molecular weights before and after the treatment were measured by the method in (1). The weight average molecular weight retention after treatment relative to the weight average molecular weight before treatment was rated as follows: 70% or more, A; 60% to less than 70%, B; less than 60%, C.

(9) Bleed-Out Resistance

A film prepared by hot pressing as described above was placed in a gear oven at 150° C. for 6 hours, and the conditions of the surface of the film were visually and manually inspected and rated as follows: no change in the surface conditions, A; finding of a small amount of liquid or powder on the surface, or slight sticky or powdery feeling, B; apparent finding of a liquid or powder on the surface, or obvious sticky or powdery feeling recognized by touching, C.

(10) Tensile Strength

Using NEX1000, an injection molding machine manufactured by NISSEI PLASTIC INDUSTRIAL CO., LTD., a polybutylene terephthalate resin was molded to obtain an ISO3167 (A type) dumbbell specimen. In this process, the temperature conditions were as follows: molding temperature, 250° C.; mold temperature, 80° C. The molding cycle conditions were as follows: the total of the injection time and the dwell time, 10 seconds; cooling time, 10 seconds. The obtained dumbbell specimen was subjected to measurement of the tensile yield strength using AG-20-kNX, an autograph manufactured by SHIMADZU CORP. The measurement was carried out in five replicates, and the mean value was determined as the tensile yield strength. The higher the tensile strength, the higher the mechanical strength.

Example 1

After heating 100 g of 1,4-butanediol (BDO) to 100° C., 11.2 g of tetra-n-butoxytitanate (TBT) was mixed therewith to obtain a catalyst solution.

To a reactor having a rectifier, 780 g of terephthalic acid (TPA) as a dicarboxylic acid, 760 g of BDO as a diol, 89.0 g of the Compound (A) having a (poly)oxyalkylene structure shown in Table 1 (7.4 parts by mass with respect to 100 parts by mass of the terminal modified polybutylene terephthalate generated), and 5.3 mL of the catalyst solution obtained by the method described above as an esterification reaction catalyst were fed. In this process, the molar ratio between BDO and TPA (BDO/TPA) was 1.8, and the amount of TBT added per 100 g of the terminal modified polybutylene terephthalate generated was $1.3 \times 10^{-4}$ moles (0.045 part by mass with respect to 100 parts by mass of the terminal modified polybutylene terephthalate). Esterification reaction was started at a temperature of 160° C. under a reduced pressure of 93 kPa. Thereafter, the temperature was slowly increased, and esterification reaction was finally allowed to proceed at a temperature of 225° C. for 285 minutes. To the reaction product obtained, 5.9 mL of the catalyst solution obtained by the method described above was added as a polycondensation reaction catalyst such that the amount of TBT added was $1.5 \times 10^{-4}$ moles per 100 g of the terminal modified polybutylene terephthalate generated (0.05 part by mass with respect to 100 parts by mass of the terminal modified polybutylene terephthalate), and polycondensation reaction was allowed to proceed for 230 minutes at a temperature of 245° C. at a pressure of 100 Pa. When the mixing torque of the reactor reached a certain value, nitrogen purge of the reactor was carried out, and the pressure was restored to normal pressure to stop the polycondensation reaction. The obtained polymer was discharged from the reactor in strands, cooled, and then immediately cut to obtain polymer pellets.

Properties of the terminal modified polybutylene terephthalate resin obtained are shown in Table 1. The solution of terminal modified polybutylene terephthalate resin in hexafluoroisopropanol was slowly added to methanol under stirring, the amount of methanol being 10 times that of the solution to cause reprecipitation, whereby Compound (A) left unreacted was removed. The precipitate was recovered and dried in a vacuum desiccator at room temperature for at least 3 hours. From the NMR spectrum of the polymer purified by the reprecipitation, Compound (A) introduced into polymer terminals was quantified. Examples 2 to 12 and Comparative Examples 1 to 8

The same procedure as in Example 1 was repeated except that the type of the compound used and the production conditions were changed as shown in Table 1 and Table 2. The amount of Compound (A) added is represented as the amount with respect to 100 parts by mass of the terminal modified polybutylene terephthalate produced.

Comparative Example 9

The same procedure as in Example 1 was carried out except that 0.1 part by mass of trimethylolpropane was added to a total of 100 parts by mass of terephthalic acid and 1,4-butanediol, and the type of the compound used was changed as shown in Table 2.

Comparative Example 10

The same procedure as in Example 1 was carried out except that 1 part by mass of trimethyl 1,3,5-benzenetricarboxylate was added to a total of 100 parts by mass of terephthalic acid and 1,4-butanediol, and that the type of the compound used was changed as shown in Table 2.

As shown in Tables 1 and 2, the terminal modified polybutylene terephthalate resins of Examples 1 to 12 each had a lower melt viscosity, higher melt stability, and higher melting point, as compared with the polybutylene terephthalate resins of Comparative Examples 1 to 8.

In the polybutylene terephthalate resins of Comparative Examples 9 and 10, the melting point and the melt stability were low because of branch structure formation. The reduction effect of melt viscosity was also low.

TABLE 1

| | | | Examples | | | | | |
| --- | --- | --- | --- | --- | --- | --- | --- | --- |
| | | | 1 | 2 | 3 | 4 | 5 | 6 |
| Compound (A) | Amount added | Parts by mass | 7.4 | 5.6 | 12.8 | 8.0 | 16.4 | 9.5 |
| | $R^1$ | Type | Methyl | Methyl | Methyl | Methyl | Methyl | Methyl |
| | $R^2$ | Type | Hydroxyl | Hydroxyl | Hydroxyl | Hydroxyl | Hydroxyl | Hydroxyl |
| | m | | 1 | 1 | 1 | 1 | 1 | 1 |
| | n | | 9 | 9 | 16 | 16 | 22 | 22 |
| | X | Type | H | H | H | H | H | H |
| | Y | Type | H | H | H | H | H | H |
| | Total carbon number excluding $R^1$ and $R^2$ | | 18 | 18 | 32 | 32 | 44 | 44 |
| | Molecular weight | | 428 | 428 | 736 | 736 | 1000 | 1000 |

TABLE 1-continued

|  |  |  | | | | | | |
|---|---|---|---|---|---|---|---|---|
| Terminal modified polybutylene terephthalate resin | Amount of Compound (A) introduced | mol/ton | 170.5 | 129.5 | 172.2 | 107.6 | 162.4 | 94.1 |
| | | mass % | 7.3 | 5.5 | 12.7 | 7.9 | 16.2 | 9.4 |
| | Introduction rate of Compound (A) | % | 87 | 66 | 92 | 53 | 83 | 47 |
| | Melt viscosity μ | Pa · s | 6 | 9 | 4 | 7 | 2 | 5 |
| | Weight average molecular weight Mw | — | 20900 | 21500 | 22300 | 20400 | 21300 | 20600 |
| | Number average molecular weight Mn | — | 10200 | 10200 | 10700 | 9900 | 10200 | 10100 |
| | Polydispersity | — | 2.05 | 2.11 | 2.08 | 2.06 | 2.09 | 2.04 |
| | Crystallization temperature on cooling Tc | °C. | 175 | 176 | 175 | 175 | 176 | 175 |
| | Crystallization enthalpy on cooling ΔHc | J/g | 49 | 53 | 54 | 50 | 51 | 56 |
| | Melting point Tm | °C. | 222 | 223 | 223 | 222 | 222 | 222 |
| | Crystal melting enthalpy ΔHm | J/g | 51 | 55 | 54 | 49 | 50 | 56 |
| | Acid value | mol/ton | 5 | 8 | 4 | 10 | 5 | 7 |
| | Weight loss ratio at 250° C. | % | 3 | 1 | 2 | 1 | 6 | 3 |
| | Hydrolysis resistance | — | A | A | A | A | A | A |
| | Bleed-out resistance | — | A | A | A | A | A | A |

|  |  |  | Examples | | | | | |
|---|---|---|---|---|---|---|---|---|
|  |  |  | 7 | 8 | 9 | 10 | 11 | 12 |
| Compound (A) | Amount added | Parts by mass | 9.4 | 6.8 | 8.1 | 12.3 | 9.4 | 8.6 |
| | R¹ | Type | Methyl | Methyl | Butyl | Stearyl | Methyl | Methyl |
| | R² | Type | Hydroxyl | Hydroxyl | Hydroxyl | Hydroxyl | Carboxyl | Hydroxyl |
| | m | | 1 | 1 | 1 | 1 | 1 | 2 |
| | n | | 9 | 16 | 12 | 15 | 16 | 12 |
| | X | Type | H | H | CH₃ | H | H | H |
| | Y | Type | H | H | H | H | H | H |
| | Total carbon number excluding R¹ and R² | | 18 | 32 | 36 | 30 | 32 | 36 |
| | Molecular weight | | 428 | 736 | 770 | 930 | 764 | 728 |
| Terminal modified polybutylene terephthalate resin | Amount of Compound (A) introduced | mol/ton | 217.4 | 91.5 | 104.1 | 130.9 | 121.8 | 117.0 |
| | | mass % | 9.3 | 6.7 | 8.0 | 12.2 | 9.3 | 8.5 |
| | Introduction rate of Compound (A) | % | 90 | 95 | 56 | 65 | 63 | 64 |
| | Melt viscosity μ | Pa · s | 2 | 9 | 9 | 6 | 7 | 9 |
| | Weight average molecular weight Mw | — | 16800 | 43800 | 22700 | 20400 | 21900 | 23000 |
| | Number average molecular weight Mn | — | 8300 | 20700 | 10800 | 10000 | 10400 | 10900 |
| | Polydispersity | — | 2.02 | 2.12 | 2.10 | 2.04 | 2.11 | 2.11 |
| | Crystallization temperature on cooling Tc | °C. | 172 | 171 | 175 | 175 | 175 | 174 |
| | Crystallization enthalpy on cooling ΔHc | J/g | 48 | 47 | 50 | 50 | 51 | 52 |
| | Melting point Tm | °C. | 221 | 222 | 222 | 222 | 222 | 222 |
| | Crystal melting enthalpy ΔHm | J/g | 48 | 49 | 51 | 52 | 52 | 51 |
| | Acid value | mol/ton | 19 | 4 | 11 | 7 | 18 | 12 |
| | Weight loss ratio at 250° C. | % | 13 | 3 | 8 | 1 | 2 | 7 |
| | Hydrolysis resistance | — | A | A | A | A | B | A |
| | Bleed-out resistance | — | A | A | A | A | A | A |

TABLE 2

|  |  |  | Comparative Examples | | | | | |
|---|---|---|---|---|---|---|---|---|
|  |  |  | 1 | 2 | 3 | 4 | 5 | 6 |
| Compound (A) | Amount added | Parts by mass | — | 3.4 | 4.0 | 5.2 | 17.6 | 0.5 |
| | R¹ | Type | — | Methyl | Methyl | Methyl | Methyl | Methyl |
| | R² | Type | — | Hydroxyl | Hydroxyl | Hydroxyl | Hydroxyl | Hydroxyl |
| | m | | — | 1 | 1 | 1 | 1 | 1 |
| | n | | — | 11 | 22 | 15 | 45 | 11 |

TABLE 2-continued

|  |  |  |  |  |  |  |  |  |
|---|---|---|---|---|---|---|---|---|
|  | X | Type | — | H | H | H | H | H |
|  | Y | Type | — | H | H | H | H | H |
|  | Total carbon number excluding R¹ and R² |  | — | 22 | 44 | 30 | 90 | 22 |
|  | Molecular weight |  | — | 516 | 1000 | 692 | 2012 | 516 |
| Terminal modified polybutylene terephthalate resin | Amount of Compound (A) introduced | mol/ton | 0.0 | 65.2 | 39.6 | 72.1 | 82.2 | 9.6 |
|  |  | mass % | 0.0 | 3.4 | 4.0 | 5.0 | 16.5 | 0.5 |
|  | Introduction rate of Compound (A) | % | 0 | 24 | 21 | 37 | 41 | 1 |
|  | Melt viscosity μ | Pa·s | 171 | 21 | 43 | 35 | 3 | 6 |
|  | Weight average molecular weight Mw | — | 20000 | 15200 | 22500 | 21100 | 21700 | 6500 |
|  | Number average molecular weight Mn | — | 9900 | 7300 | 10700 | 10200 | 10000 | 3000 |
|  | Polydispersity | — | 2.02 | 2.08 | 2.10 | 2.07 | 2.17 | 2.17 |
|  | Crystallization temperature on cooling Tc | °C. | 169 | 173 | 174 | 174 | 177 | 171 |
|  | Crystallization enthalpy on cooling ΔHc | J/g | 45 | 44 | 47 | 49 | 52 | 42 |
|  | Melting point Tm | °C. | 222 | 222 | 223 | 222 | 223 | 214 |
|  | Crystal melting enthalpy ΔHm | J/g | 44 | 43 | 47 | 50 | 53 | 43 |
|  | Acid value | mol/ton | 16 | 32 | 10 | 11 | 11 | 45 |
|  | Weight loss ratio at 250° C. | % | 2 | 3 | 4 | 3 | 17 | 13 |
|  | Hydrolysis resistance | — | B | C | A | A | A | C |
|  | Bleed-out resistance | — | A | C | A | A | B | A |

|  |  |  | Comparative Examples ||||
|---|---|---|---|---|---|---|
|  |  |  | 7 | 8 | 9 | 10 |
| Compound (A) | Amount added | Parts by mass | 7.4 | 16.4 | 0.5 | 34.0 |
|  | R¹ | Type | Hydroxyl | Methyl | Methyl | Methyl |
|  | R² | Type | Hydroxyl | Methyl | Hydroxyl | Hydroxyl |
|  | m |  | 1 | 1 | 1 | 1 |
|  | n |  | 9 | 22 | 11 | 45 |
|  | X | Type | H | H | H | H |
|  | Y | Type | H | H | H | H |
|  | Total carbon number excluding R¹ and R² |  | 18 | 44 | 22 | 90 |
|  | Molecular weight |  | 428 | 1000 | 516 | 2012 |
| Terminal modified polybutylene terephthalate resin | Amount of Compound (A) introduced | mol/ton | Unquantifiable | 0.0 | 9.6 | 167.3 |
|  |  | mass % | Unquantifiable | 0.0 | 0.5 | 33.7 |
|  | Introduction rate of Compound (A) | % | Unquantifiable | 0 | Unquantifiable | Unquantifiable |
|  | Melt viscosity μ | Pa·s | 228 | 127 | 95 | 116 |
|  | Weight average molecular weight Mw | — | 26300 | 21300 | 23000 | 33800 |
|  | Number average molecular weight Mn | — | 10100 | 10800 | 7300 | 9800 |
|  | Polydispersity | — | 2.60 | 1.97 | 3.15 | 3.45 |
|  | Crystallization temperature on cooling Tc | °C. | 162 | 165 | 162 | Undetected |
|  | Crystallization enthalpy on cooling ΔHc | J/g | 38 | 33 | 36 | Undetected |
|  | Melting point Tm | °C. | 209 | 218 | 219 | 214 |
|  | Crystal melting enthalpy ΔHm | J/g | 37 | 34 | 36 | 33 |
|  | Acid value | mol/ton | 15 | 18 | 13 | 8 |
|  | Weight loss ratio at 250° C. | % | 4 | 20 | 8 | 26 |
|  | Hydrolysis resistance | — | B | B | A | A |
|  | Bleed-out resistance | — | A | C | A | A |

Examples 13 and 14, and Comparative Examples 11 to 14

An unmodified polybutylene terephthalate resin (Mw=21,000) was preblended with each of the terminal modified polybutylene terephthalate resins obtained in Examples and Comparative Examples as shown in Table 3. Each resulting mixture was fed to a twin screw extruder (TEX30α-45 available from Japan Steel Works, LTD.) with a cylinder temperature of 250° C. and a screw speed of 200 rpm, and melt-kneaded. A gut discharged from the extruder was pelletized to obtain polymer pellets. The tensile strength of an injection-molded article using the obtained polymer pellets is shown in Table 3.

Based on a comparison of Examples 13 and 14 with Comparative Examples 11 to 14, it can be seen that a polyester resin composition prepared by melt kneading of our terminal modified polybutylene terephthalate resin has a sufficiently low melt viscosity as well as an excellent mechanical strength.

TABLE 3

| | | | Example 13 | Example 14 | Comparative Example 11 | Comparative Example 12 | Comparative Example 13 | Comparative Example 14 |
|---|---|---|---|---|---|---|---|---|
| Terminal unmodified polybutylene terephthalate resin | Amount added | Parts by mass | 80 | 86 | 80 | 80 | 90 | 80 |
| Terminal modified polybutylene terephthalate resin | Resin used | | Example 1 | Example 3 | Comparative Example 1 | Comparative Example 4 | Comparative Example 5 | Comparative Example 6 |
| | Amount added | Parts by mass | 20 | 14 | 20 | 20 | 10 | 20 |
| thermoplastic resin composition | Melt viscosity μ | Pa·s | 38 | 43 | 159 | 132 | 49 | 31 |
| | Tensile strength | MPa | 55 | 54 | 56 | 55 | 42 | 35 |

INDUSTRIAL APPLICABILITY

Our terminal modified polybutylene terephthalate resin, for its high melt processability due to a low melt viscosity, can be melt processed into various products such as fibers, films, bottles, and injection-molded articles, using known methods. These products are useful for agricultural materials, gardening materials, fishing materials, civil engineering and construction materials, stationery, medical supplies, automobile components, electrical and electronic components, or other applications.

The invention claimed is:

1. A terminal modified polybutylene terephthalate resin having a weight average molecular weight Mw of 10,000 to 100,000, a melting point of 210° C. to 235° C., and a melt viscosity μ at 250° C. of not more than 10 Pa·s, comprising 90 to 300 mol/ton of a compound having a (poly)oxyalkylene structure represented by Formula (A), said compound being terminally bound in said resin, wherein the weight average molecular weight Mw represents a relative weight average molecular weight with respect to the molecular weight of a standard poly (methyl methacrylate) as determined by gel permeation chromatography using hexafluoroisopropanol (supplemented with 0.005 N sodium trifluoroacetate) as a mobile phase,

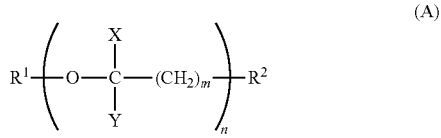
(A)

wherein,
$R^1$ represents a group selected from the group consisting of $C_1$-$C_{30}$ alkyl, $C_6$-$C_{20}$ cycloalkyl, $C_6$-$C_{10}$ aryl, and $C_7$-$C_{20}$ aralkyl;
$R^2$ represents a group selected from the group consisting of hydroxyl, carboxyl, amino, silanol, and thiol;
m represents an integer of 1 to 3;
n represents an integer of 1 to 29;
X represents a hydrogen atom and/or methyl;
Y represents a hydrogen atom and/or methyl; and
the total carbon number of the portion excluding $R^1$ and $R^2$ is 2 to 58.

2. The terminal modified polybutylene terephthalate resin according to claim 1, having a crystal melting enthalpy of 40 to 60 J/g, the crystal melting enthalpy being determined by differential scanning calorimetry (DSC) in which the resin is heated from 30° C. to 250° C. at a heating rate of 20° C./min., held at 250° C. for 5 minutes, cooled from 250° C. to 30° C. at a cooling rate of 20° C./min., and heated from 30° C. to 250° C. at a heating rate of 20° C./min.

3. The terminal modified polybutylene terephthalate resin according to claim 1, having an acid value of 13 mol/ton or less.

4. The terminal modified polybutylene terephthalate resin according to claim 1, having a weight loss ratio upon heat treatment at 250° C. for 1 hour under nitrogen gas flow of not more than 15%.

5. The terminal modified polybutylene terephthalate resin according to claim 1, having a polydispersity (Mw/Mn), a ratio of weight average molecular weight (Mw) to number average molecular weight (Mn), of 2.5 or less.

6. A thermoplastic resin composition comprising the terminal modified polybutylene terephthalate resin according to claim 1 and another thermoplastic resin, wherein said terminal modified polybutylene terephthalate resin is contained in an amount of 5 to 30 parts by mass with respect to 100 parts by mass of said another thermoplastic resin.

7. The thermoplastic resin composition according to claim 6, wherein said another thermoplastic resin is one or more resins selected from the group consisting of polyethylene terephthalate, polytrimethylene terephthalate, polybutylene terephthalate, polyethylene naphthalate, and polybutylene naphthalate.

8. A molded article comprising the thermoplastic resin composition according to claim 6.

* * * * *